United States Patent
Beneveniste (10) Patent No.: US 7,656,854 B2
(45) Date of Patent: Feb. 2, 2010

(54) AVOIDING HIDDEN TERMINALS IN WIRELESS LOCAL AREA NETWORKS

(75) Inventor: Mathilde Beneveniste, South Orange, NJ (US)

(73) Assignee: Avaya Inc., Basking Ridge, NJ (US)

(*) Notice: Subject to any disclaimer, the term of this patent is extended or adjusted under 35 U.S.C. 154(b) by 566 days.

(21) Appl. No.: 11/449,922

(22) Filed: Jun. 8, 2006

(65) Prior Publication Data
US 2007/0002814 A1    Jan. 4, 2007

Related U.S. Application Data

(60) Provisional application No. 60/688,335, filed on Jun. 8, 2005, provisional application No. 60/690,522, filed on Jun. 15, 2005.

(51) Int. Cl.
*H04B 7/212* (2006.01)

(52) U.S. Cl. .............. 370/348; 370/329; 370/310.2; 370/336; 370/474

(58) Field of Classification Search .............. 370/445, 370/462, 336, 326, 348, 447
See application file for complete search history.

(56) References Cited

U.S. PATENT DOCUMENTS

| | | | | | |
|---|---|---|---|---|---|
| 5,844,905 | A  | * | 12/1998 | McKay et al. | 370/443 |
| 7,046,690 | B2 | * | 5/2006  | Sherman | 370/445 |
| 7,164,671 | B2 | * | 1/2007  | del Prado et al. | 370/338 |
| 7,330,457 | B2 | * | 2/2008  | Panwar et al. | 370/338 |
| 7,385,961 | B2 | * | 6/2008  | Stephens | 370/338 |
| 2002/0071449 | A1 | | 6/2002 | Ho et al. | 370/447 |
| 2002/0154653 | A1 | | 10/2002 | Beneveniste | 370/447 |
| 2002/0172186 | A1 | * | 11/2002 | Larsson | 370/349 |
| 2004/0162024 | A1 | * | 8/2004 | Wentink | 455/41.2 |
| 2005/0002355 | A1 | * | 1/2005 | Takano | 370/329 |
| 2005/0141448 | A1 | * | 6/2005 | Bolinth et al. | 370/329 |
| 2005/0165950 | A1 | * | 7/2005 | Takagi et al. | 709/236 |
| 2005/0208956 | A1 | * | 9/2005 | Takagi et al. | 455/464 |
| 2005/0265393 | A1 | * | 12/2005 | Fischer et al. | 370/474 |
| 2006/0114867 | A1 | * | 6/2006 | Du et al. | 370/338 |
| 2006/0187964 | A1 | * | 8/2006 | Li et al. | 370/474 |
| 2006/0291432 | A1 | * | 12/2006 | Xhafa et al. | 370/336 |
| 2007/0077936 | A1 | * | 4/2007 | Tomisawa et al. | 455/450 |

OTHER PUBLICATIONS

PCT search report from related PCT Application No. PCT/US06/22484, total pp. 3.

* cited by examiner

*Primary Examiner*—Ricky Ngo
*Assistant Examiner*—Dewanda Samuel
(74) *Attorney, Agent, or Firm*—Chapin IP Law, LLC (57) ABSTRACT

A method, apparatus and computer program product for preventing occurrences of the hidden node problem are presented. A transmission request (CC-RTS) is received from a source node, the CC-RTS frame including a reservation duration value indicating the length of time needed for a transmission reservation. A timer is adjusted for the period other nodes must refrain from transmitting on the channel (NAV) equal to a duration of a transmission request/transmission response (CC-RTS/CC-CTS) handshake. When the CC-RTS has been denied, then a second CC-RTS frame is received having a reservation duration value of zero, and when the CC-RTS is accepted then the NAV is extended to remainder of the reservation duration value of the original CC-RTS frame. The CC-RTS and CC-CTS are sent at a more robust PHY mode than traffic frames.

21 Claims, 9 Drawing Sheets

PRIOR ART

AVOIDING HIDDEN TERMINALS IN WIRELESS LOCAL AREA NETWORKS

CROSS REFERENCE TO RELATED APPLICATIONS

The present application claims the benefit of U.S. Provisional Patent Application No. 60/688,335, filed on Jun. 8, 2005, and to U.S. Provisional Patent Application No. 60/690,522, filed on Jun. 15, 2005, both of which are incorporated herein by reference.

BACKGROUND

Wireless Local Area Networks (WLANS) have become ubiquitous. In wireless Local Area Networks (LANS), a wireless channel can be reserved for the transmission of a sequence of frames while employing asynchronous distributed random channel access methods. In such an environment, both the source and destination of the transmission broadcast the reservation duration in order to establish the interference neighborhood.

According to the 802.11 distributed channel access MAC protocol, RTS/CTS frames are used to notify neighbors of a transmission. The source and destination of the transmission the RTS and CTS frames, respectively, which contain the reservation duration in order to establish the interference neighborhood. Nodes receiving either frame refrain from transmitting or agreeing to receive a transmission for the specified duration. This way, 'hidden terminals', that is nodes that cannot hear the transmission by may cause interference to the receiving node, will refrain from transmitting for the duration indicated in the received CTS frame.

One method of reserving the channel and preventing collisions with hidden terminals in wireless LANS is by utilizing Frame-by-frame reservation. RTS/CTS frames are sent at the start of the reservation. The reservation time is extended on a frame-by-frame basis, by updating the duration of the reservation with each data frame and the acknowledgement that follows. A consequence of frame-by-frame reservation if that, if the reservation is not accepted—that is, a CTS frame is not returned in tine—there is no reserved time left unused and, hence, the reservation does not require cancellation.

Another method of performing reservation in wireless LANS is by utilizing Start-to-finish reservation. A start-to-finish reservation applies to any combination of nodes (i.e. mesh points/APs/stations). A node reserves a channel to cover an entire sequence of transmissions, directed to a single destination, possibly including responses from the destination. Under this method, the channel may be reserved by setting the duration field value to the time it will to transmit the entire sequence of frames. If the reservation request is not authorized—that is, a CTS frame is not returned in tine—or if time remains reserved at the completion of transmission, the reservation must be cancelled.

Cancellation of a reservation can be problematic in an 802.11 WLAN, because a node relies on a single timer, the NAV, in order to determine if the channel is available for transmission. When a node receives a frame with a value in the Duration field that would extend the occupancy of the channel beyond that of prior reservations, the NAV timer is updated to reflect the longer reservation. It is possible for a node to receive multiple NAV-setting frames from different sources. For instance, a node may receive a CTS frame from one neighbor, and an RTS from another neighbor, who has not received the CTS. Cancellation of the transmission associated with the RTS could be achieved either by listening for an idle channel, or by receiving an explicit cancellation of the reservation from the source of the RTS. If a node resets its NAV based on such a cancellation, it risks causing interference/collision to the neighbor that had sent the CTS frame if this neighbor is still receiving the transmission associated with that CTS frame. Because a single NAV timer is maintained, independently of the source of the NAV-setting request, there is no way to determine whether cancellation of a reservation should cause the NAV timer to be reset.

In spite of this deficiency, the start-to-finish NAV setting method is important because it affords protection from 'hidden terminals', a problem that is exacerbated in mesh networks because of the long distances between neighbors.

WLANS can include multiple channels and multiple radios. An approach that offers both multi-channel and multi-radio capabilities appears in the co-pending patent application titled "A Protocol For Wireless Multi-Channel Access Control", Ser. No. 11/393,127, filed Mar. 29, 2006, the disclosure of which is incorporated by reference herein, which describes the CCC (Common Control Channel) MAC protocol. CCC utilizes two types of logical channels, the control channel and the data channels.

SUMMARY

Conventional mechanisms such as those explained above suffer from a variety of deficiencies. One such deficiency arises as a result of the 'hidden terminal' problem. The hidden terminal problem arises when a station cannot hear the transmitter but is within interference range of the receiver. The problem is more serious in ad hoc networks with nodes separated by long distances, an example of which is found in a wireless mesh.

Typically, he hidden terminal problem can be alleviated through the exchange of the RTS/CTS control frames. However, when the distances separating nodes are long, neighbor nodes within interference range of the receiver of the transmission associated with the RTS/CTS pair may not outside the transmit range of the node sending the CTS, and, therefore, would be unable to read the CTS frame. Such neighbors would not be setting their NAV when the CTS is transmitted, and may thus cause interference to the receiving node. To avoid this problem, the RTS/CTS frames can be transmitted at a lower speed in order to increase the transmit range. A consequence of this measure is that reservation of the channel for a sequence of frames would have to be made on a start-to-finish basis. Individual data frames cannot be relied on to increase the reservation as such frames would be sent at higher speed and thus have a shorter transmit range.

The use of start-to-finish NAV setting requests, in addition to providing protection from hidden terminals, also enables the reservation of different channels in a multi-channel access control protocol. An example of a such a protocol is CCC. Control frames are exchanged on a control channel to reserve one of a pool of available data channels. In such a case, extension of a channel's reservation on a frame by frame basis would require the exchange of additional control frames on the control channel, which would be inefficient.

The present invention eliminates the need to cancel a reservation request that is not authorized. While the method is presented in the context of the multi-channel CCC MAC protocol, it applies also to single channel access.

Embodiments of the invention significantly overcome such deficiencies and provide mechanisms and techniques for avoiding hidden terminals in a wireless network. The hidden terminal problem is addressed by using control messaging exchanged on the control channel in order to reserve a channel for the duration of the sequence of transmissions (TXOP) to occur with a single reservation on a data channel. Setting of the NAV of the channel to be reserved is delayed until the reservation is admitted, thus obviating the need for cancellation.

In a particular embodiment of a method for preventing occurrences of the hidden node problem the method includes receiving at a destination node in a Wireless Local Area Network (WLAN) a transmission request (CC-RTS) frame from a source node in the WLAN, the CC-RTS frame including a reservation duration value indicating the length of time needed for a transmission reservation. The method further includes adjusting by each node that has heard the CC-RTS a timer indicating the period the node in the WLAN must refrain from transmitting on the channel (NAV) for a time period of a reservation duration of a transmission request/transmission response (CC-RTS/CC-CTS) handshake. The method also includes determining by the destination node whether the CC-RTS has been accepted by the destination node. When the CC-RTS has not been accepted, then receiving a second CC-RTS frame having a reservation duration value of zero at the destination node from the source node and when the CC-RTS is accepted by the destination node then extending the NAV to the reservation duration of the remainder of the reservation duration value of the original CC-RTS frame by the source node.

Other embodiments include a computer readable medium having computer readable code thereon for preventing occurrences of the hidden node problem. The medium includes instructions for receiving at a destination node in a Wireless Local Area Network (WLAN) a transmission request (CC-RTS) frame from a source node in the WLAN, the CC-RTS frame including a reservation duration value indicating the length of time needed for a transmission reservation. The medium further includes instructions for adjusting by each node that has heard the CC-RTS a timer indicating the period the node in the WLAN must refrain from transmitting on the channel (NAV) for a time period of a reservation duration of a transmission request/transmission response (CC-RTS/CC-CTS) handshake and determining by the destination node whether the CC-RTS has been accepted by the destination node. When the CC-RTS has not been accepted, then receiving a second CC-RTS frame having a reservation duration value of zero at the destination node from the source node, and when the CC-RTS is accepted by the destination node then extending the NAV to the reservation duration of the remainder of the reservation duration value of the original CC-RTS frame by the source node.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that prevents the hidden node problem from occurring as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations that prevents the hidden node problem from occurring as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc. of Lincroft N.J.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Wireless LAN networks may utilize a Common Control Protocol (CCC). The CCC protocol is a MAC protocol that extends the IEEE 802.11 distributed MAC protocol to enable use of multiple channels within a BSS or mesh network. The CCC protocol defines a flexible channel access architecture based on distributed prioritized contention-based medium access. The CCC protocol distinguishes between two logical channel functions, the Control Channel (CC) and the Data Channel (DC). In the description that follows, stations or mesh points observing the CCC MAC protocol are referred to as 'nodes'. Nodes exchange control and management frames on the control channel. The data channels carry data traffic.

Reservations for transmission on the various data channels are made by exchanging control frames on the control channel. As extensions of the legacy RTS and CTS messages, the CC-RTS and CC-CTS are used to reserve a data channel for the time it takes to transmit a Transmission Opportunity (TXOP). A TXOP is a sequence of frames (and their respective acknowledgements) transmitted serially, immediately following a single successful contention-based channel access attempt, as for instance that prescribed by the IEEE 802.11e standard. The particular data channel selected for transmission of the TXOP is indicated in a special field on the CC-RTS/CC-CTS. The CC-RTS/CC-CTS exchange could be defined so that it can reserve multiple data channels, or a data channel and the control channel, for the same time interval. A node keeps track of the length of time for which a channel(s) is reserved in a channel-specific NAV, based on the value of the Reservation Duration field of the CC-RTS/CC-CTS.

Both the forwarding and receiving node maintain a NAV for each usable channel. A node monitors the control channel and keeps track of all reservations made by other nodes to determine the busy/idle status of data channels, and when they will become available. The Reservation Duration field on the CC-RTS/CC-CTS is used to update the NAV for the channel reserved. The CC-RTS/CC-CTS Reservation Duration field is different from the Duration/ID field in the MAC header of the CC-RTS/CC-CTS frames. The latter indicates the length of the CC-RTS/CC-CTS transmission on the control channel. A reservation request is declined if the receiving node deems the requested channel busy, or if all its radios are busy.

The receiving node responds with a CC-CTS within a time interval of length Short InterFrame Space (SIFS). A CC-CTS is sent to indicate acceptance of a channel reservation request. The Reservation Duration field is copied in the CC-CTS sent by the receiving node. If a CC-CTS is not received, the forwarding node assumes that the reservation request is declined. A reservation is accepted if the data channel indicated in the CC-RTS will become idle within a pre-specified time interval, according to the NAV maintained by the receiving node and if the receiving node has available radios to receive the transmission. Successful receipt of a data traffic transmission is followed by an acknowledgement sent either on the data channel according to EDCA rules or as a group acknowledgment on the control channel.

Different frames utilized include a CC-RTS frame, used by a node initiating a TXOP. This frame includes several fields including a source node; a destination node; a source node transmit channel; a duration and a number of frames in TXOP. A CC-CTS frame is used by a node accepting a TXOP. The CC-CTS frame includes several fields including a destination node; a source node; a source node transmit channel; a duration; a number of frames in TXOP; and a Radio Counter. A CC-ACK frame identifies the individual frame in a sequence of frames that were received successfully. The CC-ACK frame includes a destination node; source node; and a TXOP frame receipt status.

Channel Reservation occurs when the source node reserves its data channel for one or multiple frames by sending a CC-RTS frame to the destination node on the control channel, provided the Channel_State indication for the data channel is idle. The Reservation Duration field and number of TXOP frames are set in the CC-RTS. The destination node sends a CC-CTS in response within SIFS. The reservation request is accepted if the destination node has a Channel_State idle indication for the source node's data channel, and the destination node has available radios to receive the transmission; i.e. the Radio Counter is non-zero. If the reservation request is accepted by the Destination node, the Reservation Duration field is adjusted and the number of frames in the TXOP is repeated in the CC-CTS sent by the destination node and the CC-CTS includes the number of its radios that remain available to receive traffic—that is the Radio Counter. (The latter is not necessary, but it is useful to other nodes with frames to send to the destination node). If the reservation request is declined by the Destination node, the Reservation Duration field in the CC-CTS is set to 0 and the source node in that case sends another CC-RTS with a Reservation Duration field set to 0. Additionally, the destination node will send a CC-CTS with a 0 in the Reservation Duration field in response to a CC-RTS with a Reservation Duration field set to 0.

When all frames in a TXOP are transmitted, the destination node will acknowledge the status of the transmit sequence by sending an acknowledgement, called CC-ACK, on the control channel. The frames received successfully will be identified in the CC-ACK. The acknowledgement will be transmitted by contending at the highest access priority To protect from hidden terminals, mesh networks require CC-RTS/CC-CTS reservations for the entire TXOP. If reservation request (CC-RTS) is denied, the source node must cancel reservation, to avoid wasting the reserved channel time. The Destination node indicates denial of CC-RTS by returning CC-CTS with Reservation duration of zero. A second CC-RTS is sent by the source node to notify neighbor nodes that heard the original CC-RTS. Resetting the NAVs of neighbors must be avoided, as cancellation of all other outstanding NAV-setting requests would result from resetting of NAVs. Accordingly, the NAV method is modified to avoid resetting NAVs.

A hidden node is one that can interfere with the receipt of a transmission that it cannot hear. In a WLAN where stations can hear one another, the hidden node problem is addressed by using CC-RTS/CC-CTS. If, however, the transmitting and receiving nodes are sufficiently separated, as in the case of nodes in a WLAN mesh, CC-RTS/CC-CTS is not effective because the interference range is longer than the transmit range. The transmit range is the range within which all nodes can hear the transmission and are able to decode it Hidden nodes will be found within interference range of the destination of a transmission but outside of the transmit range. Consider the mesh illustrated in FIG. 1. The wireless network 10 includes a plurality of nodes, nodes 1-6. Node 1 has an associated transmit range (TX Range) 14 and an associated interference range 12. Due to the spatial arrangement of a mesh, nodes can behave as hidden nodes. Interference range 12 of node 1 is the range within which existing communications of nodes can be disrupted by a transmission from node 1. Tx Range 14 of node 1 is the range within which all nodes can hear a transmission from node 1 and is able to decode the packet.

Figure 1:
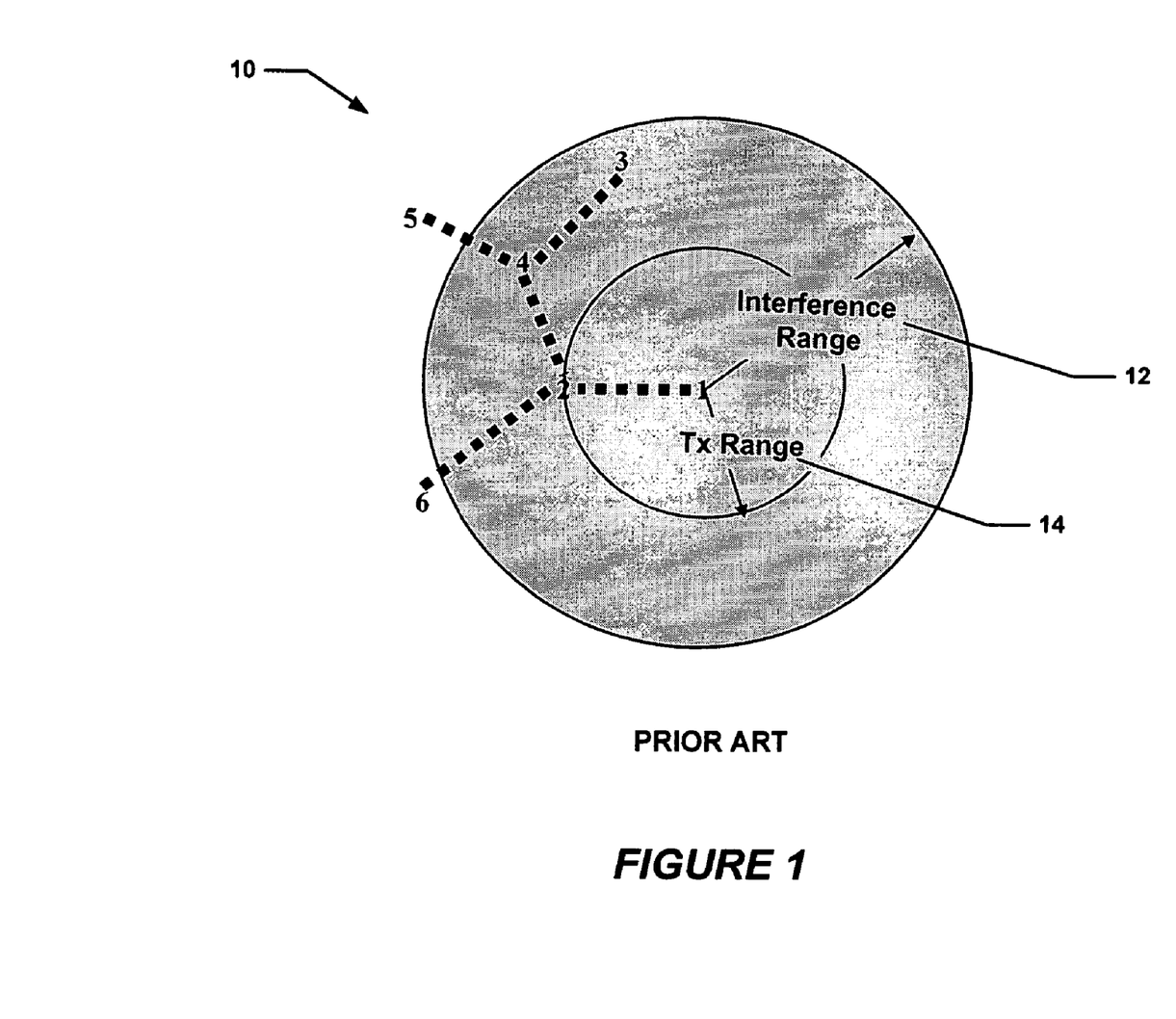
FIG. 1 depicts a diagram of a wireless network showing a transmit range and an interference range of a node in the wireless network.

Node 1 sends a CC-RTS to node 2 and node 2 responds with a CC-CTS. Nodes 3 and 5, which are within interference range of node 2, are not within transmit range of node 2, so they do not hear the CC-CTS. As in the case of a BSS, to protect against hidden nodes, CC-RTS/CC-CTS must be used. Because of the distance separating potentially interfering nodes, the CC-RTS/CC-CTS must be sent at a more robust PHY mode than mesh traffic frames. That is, the CC-RTS/CC-CTS would be transmitted either at higher transmit power or a lower data rate than mesh traffic. This way, the transmit range for CC-RTS/CC-CTS could be the same as the interference range of mesh transmissions. The CC-RTS/CC-C TS can then be received and read at interference range. Reservations must be made for the entire TXOP using start-to-finish reservations.

Use of CC-RTS/CC-CTS to avoid hidden nodes gives rise to a problem in canceling reservations when transmitting a TXOP (a sequence of frames transmitted with a separation of a SIFS idle between them). According to the 802.11e draft, there are two ways to reserve channel time for the transmission of a TXOP. One is to reserve the channel for the reservation duration of the entire TXOP and the other is to reserve the channel for one frame at a time. Since a CC-RTS/CC-CTS is needed, a single CC-RTS/CC-CTS will reserve the channel for the entire TXOP duration. If the reservation request is not accepted, the reservation for the TXOP must be cancelled in order to enable use of the reserved channel for another transmission.

In the CCC MAC protocol, notification of denial of a reservation is communicated to all nodes by a second CC-RTS from the forwarding node containing a Reservation duration field set to zero. The forwarding node is notified of the denial of the request when it receives a CC-CTS with Reservation duration field set to zero. According to the 802.11 NAV rules, a node that hears a frame with a non-zero duration field updates its NAV for the channel to account for the expiration of the new duration value as well as all previous NAV-setting requests. A NAV is therefore the composite of multiple NAV-setting requests from different sources.

A node that hears notice of the cancellation of an earlier NAV-setting request cannot simply reset the NAV. Other NAV setting requests may be outstanding, as it is possible for a node to hear multiple NAV-setting requests for the same channel from nodes that cannot hear one another. Canceling a channel's NAV could thus lead to collisions. A different way is described below for setting the NAV of a channel when reservation is sought through a CC-RTS. The new NAV setting approach obviates the need for resetting a NAV when a reservation is cancelled.

Figure 2:
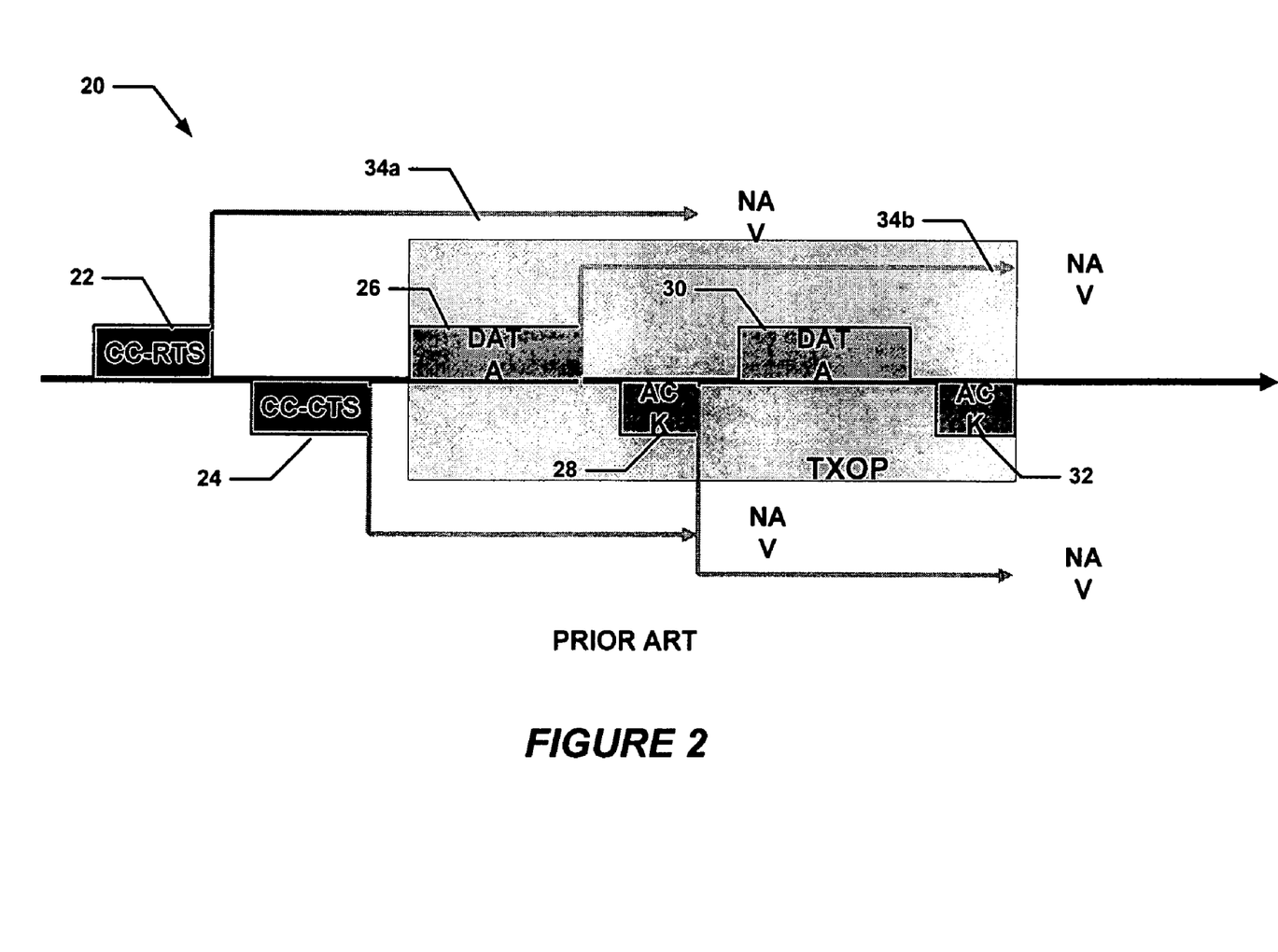
FIG. 2 depicts a timing diagram of conventional frame-by-frame reservation in a wireless network.

A wireless channel can be reserved for the transmission of a sequence of frames while using CSMA/CA. Both the source and destination of the transmission broadcast the reservation duration in order to establish the interference neighborhood. As discussed above, and as shown in FIG. 2, a reservation can occur on a frame-by-frame basis. According to the 802.11 distributed channel access MAC protocol, RTS/CTS frames are used to notify neighbors of the start of the reservation. The reservation time is extended on a frame-by-frame basis, by updating the reservation duration of the reservation with each data frame and the acknowledgement that follows. In this scenario 20, the NAV is set one frame at a time. The duration field of a data frame is used to extend the NAV. The RTS 22 sets the NAV 34a for the duration of the next frame 26 and it's ACK 28. When a CTS 24 is returned in response to the RTS 22, transmission of the data frame 26 begins with a Short Interface Space (SIFS)). The duration field of data frame 26 extends the NAV 34b for the duration of the next data frame 30 and ACK 32. If the reservation is denied, it does not require a reservation cancellation.

Figure 3:
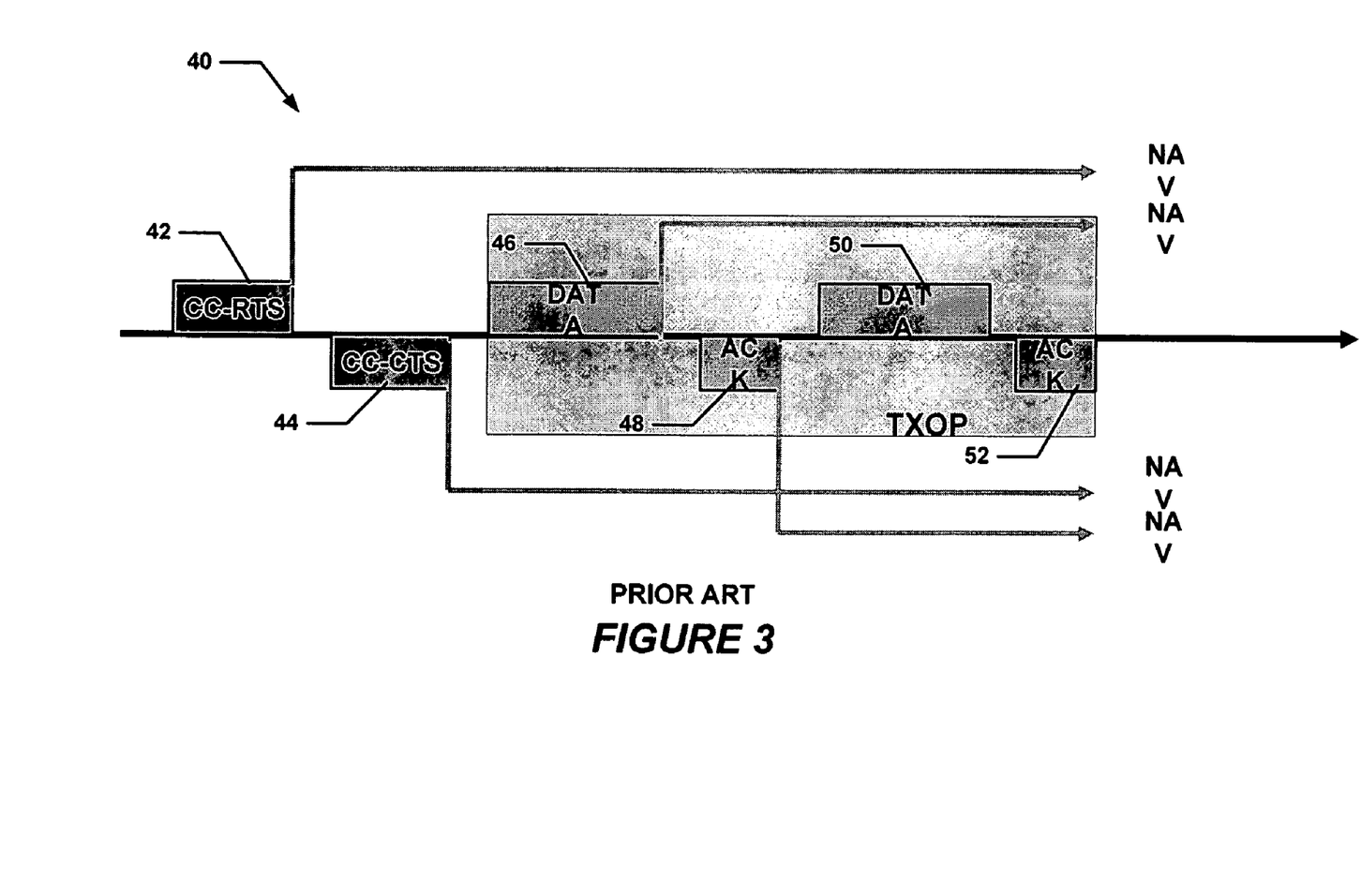
FIG. 3 depicts a timing diagram of conventional start-to-finish reservation in a wireless network.

Referring now to FIG. 3, reservation of the channel can be made with a single RTS/CTS for the entire sequence. The channel is reserved for the entire TXOP. The duration field in the RTS 42 is set to the time needed for the data frames 46 and 50, and the ACKs 48 and 52. Once the CTS 44 is returned, transmission of the Data frames 46 and 50 and the ACKs 48 and 52 begin within a SIFS time. If the reservation request is denied, or if time remains reserved at the completion of transmission, the remaining reservation time must be cancelled.

Figure 4:
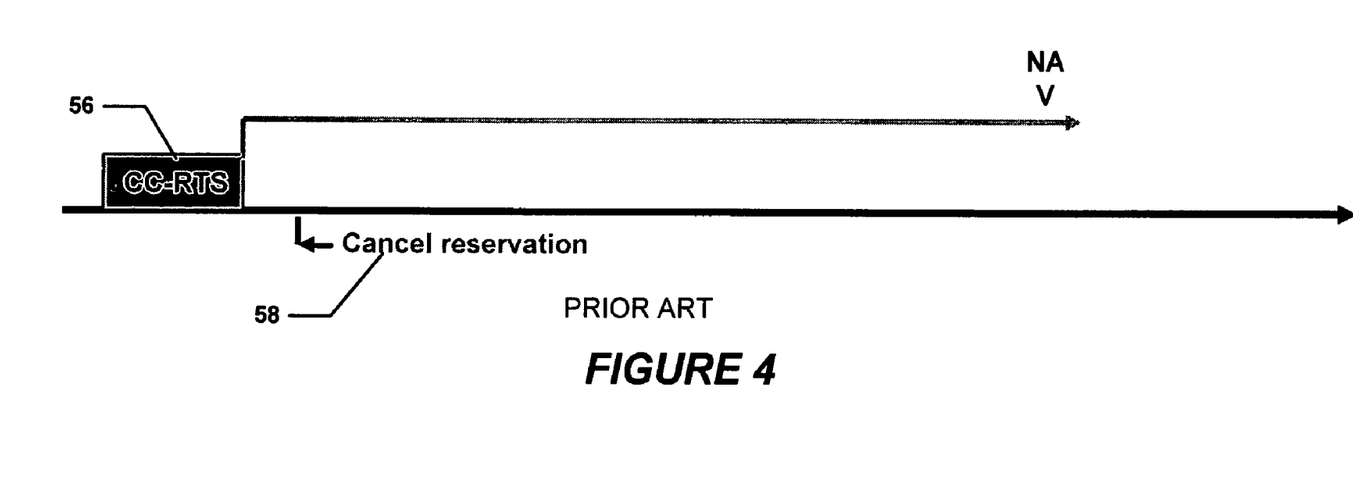
FIG. 4 depicts a timing diagram showing a need for a reservation cancellation.

As shown in Figure the RTS 58 sets the NAV for the reservation duration value of the TXOP. In the event the reservation is not accepted (58), the remaining reservation time of the NAV should be cancelled to permit use of the channel.

Figure 5:
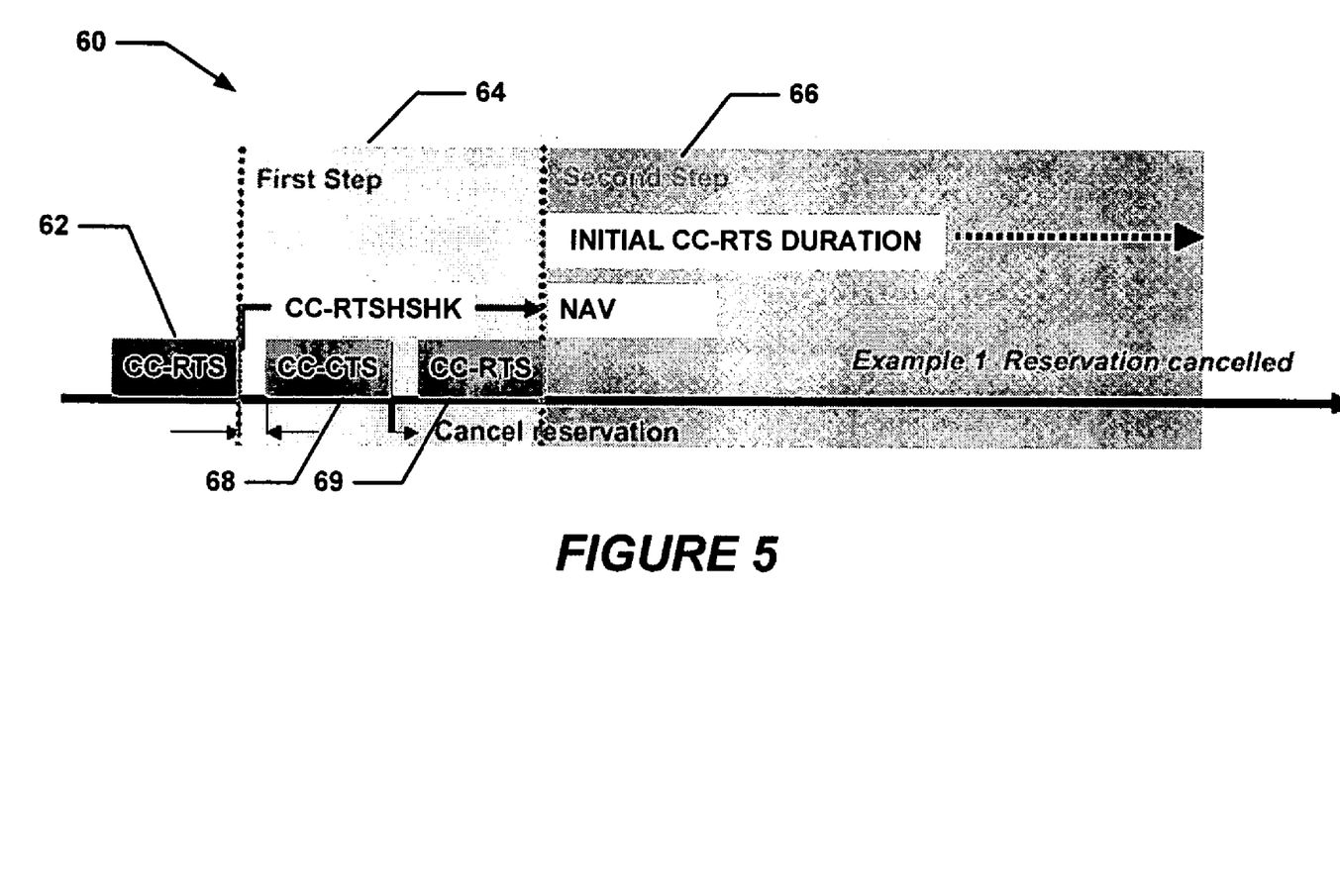
FIG. 5 depicts a timing diagram showing a two-step reservation when a reservation has been cancelled in accordance with embodiments of the invention.

Referring now to FIG. 5, in order to avoid hidden nodes, a two-step NAV setting process is utilized. The NAV is the time period other nodes must refrain from transmitting on the channel. To avoid collisions, each node keeps a NAV which is set according to the received reservation requests and responses. A reservation is requested with a CC-RTS 62 with a reservation duration set to the reservation length. The Destination node indicates denial of CC-RTS 62 by returning CC-CTS 68 with Reservation duration of zero. A second CC-RTS 69 with Reservation duration of zero is sent by source node to notify neighbor nodes that heard the original CC-RTS 62. In this scenario 60, the NAV is only set for the first step duration 64, the reservation duration of a CC-CTS/CC-RTS handshake. The NAV is not extended for second step 66 since the reservation was cancelled by receipt of the CC-CTS 68 having a reservation duration of zero. In response to a CC-CTS, or another frame, the NAV is updated according to the Reservation duration field. The NAV is updated when the Reservation duration field in the received frame requires extension of its expiration time. In FIG. 5, the initial reservation for TXOP is cancelled when a second CC-RTS is heard from the same MP with Reservation duration set to 0, and therefore the NAV is not extended beyond the initial setting of CC-RTSHSHK.

Figure 6:
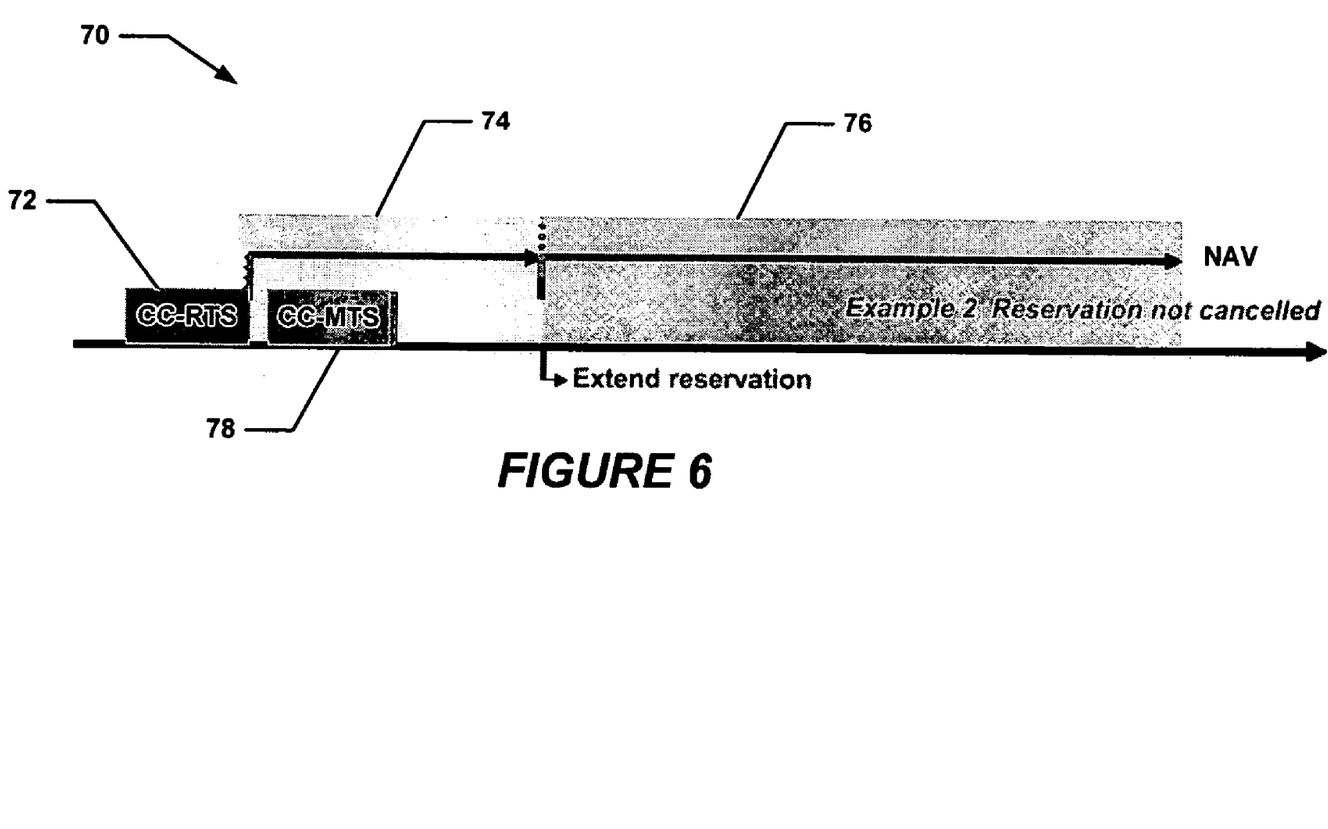
FIG. 6 depicts a timing diagram showing a two-step reservation when a reservation has not been cancelled in accordance with embodiments of the invention.

Referring now to FIG. 6, a two-step NAV is shown when the reservation is not cancelled. In this scenario 70, the NAV is updated for the reservation duration of a CC-CTS/CC-RTS handshake 74. A station receiving a CC-RTS 72 will not update the NAV of that channel for the entire value of the Reservation duration field, but only for a time interval of length CC-RTSHSHK 74. If CC-RTS 72 is not cancelled (e.g., by receiving a CC-CTS 68 having a reservation duration value greater than zero), the NAV is updated for the remainder 76 of the initial CC-RTS 72 reservation duration. The reservation is not cancelled and therefore the NAV is extended to cover the entire reservation duration in the initial CC-RTS 72.

The CC-RTS 72 from the source node updates NAV for the time CC-RTSHSHK. This time period CC-RTSHSHK comprises the CC-CTS transmit time plus the CC-RTS transmit time plus the time for the two SIFS associated with the CC-CTS and the CC-RTS (CC-CTSTxTime+CC-RTSTxTime+2*SIFS). A background timer is used to update the main NAV timer after a time interval CC-RTSHSHK has elapsed. If multiple CC-RTS frames are received within a time interval CC-RTSHSHK, a station must remember the (source ID, reservation duration) pair of each CC-RTS received. This information must be remembered until the NAV is updated for the full CC-RTS reservation duration. A station may retain information for a limited number of CC-RTS, those with the longest residual reservation duration.

In summary, the NAV of a channel is set in two steps when hearing a CC-RTS. Upon receipt of initial CC-RTS, a node updates the NAV for the specified channel for the time interval CC-RTSHSHK needed to transmit a CC-CTS and another CC-RTS. If a cancellation CC-RTS is not received, a node then sets the NAV for the remaining Reservation duration value indicated in the initial CC-RTS or the extended Reservation duration value indicated in a subsequent CC-RTS. If the reservation is declined, the NAV expires without the need for further action.

While the present application has been described with respect to a WLAN having multiple channels, similar concepts apply in a scenario with only a single channel is used. In this single channel scenario, neighbor nodes must be alerted when a reservation is cancelled. The NAV clearing mechanism is an optional mechanism in the standard which allows a station to clear its NAV if the station used information from an RTS frame as the most recent basis to update its NAV and there is no signal detected for 2 SIFS+CTS_duration+2 SlotTime [IEEE 802.11:9.2.5.4]. This allows reuse of the channel in case the 4-way handshake cannot be completed. In order to avoid collisions caused by NAV clearing the following is used: A station remembers whether the duration of a CTS has expired. If not, the CTS is 'pending'. A flag CTS_PENDING is set when a new CTS arrives with non-zero Duration field. The flag is cleared when the NAV expires. A station will clear its NAV, if the channel is idle for specified time interval, and the flag CTS_PENDING is clear. If the flag CTS_PENDING is set, the station does not clear the NAV. This allows for collision avoidance caused by NAV clearing.

Figure 7A:
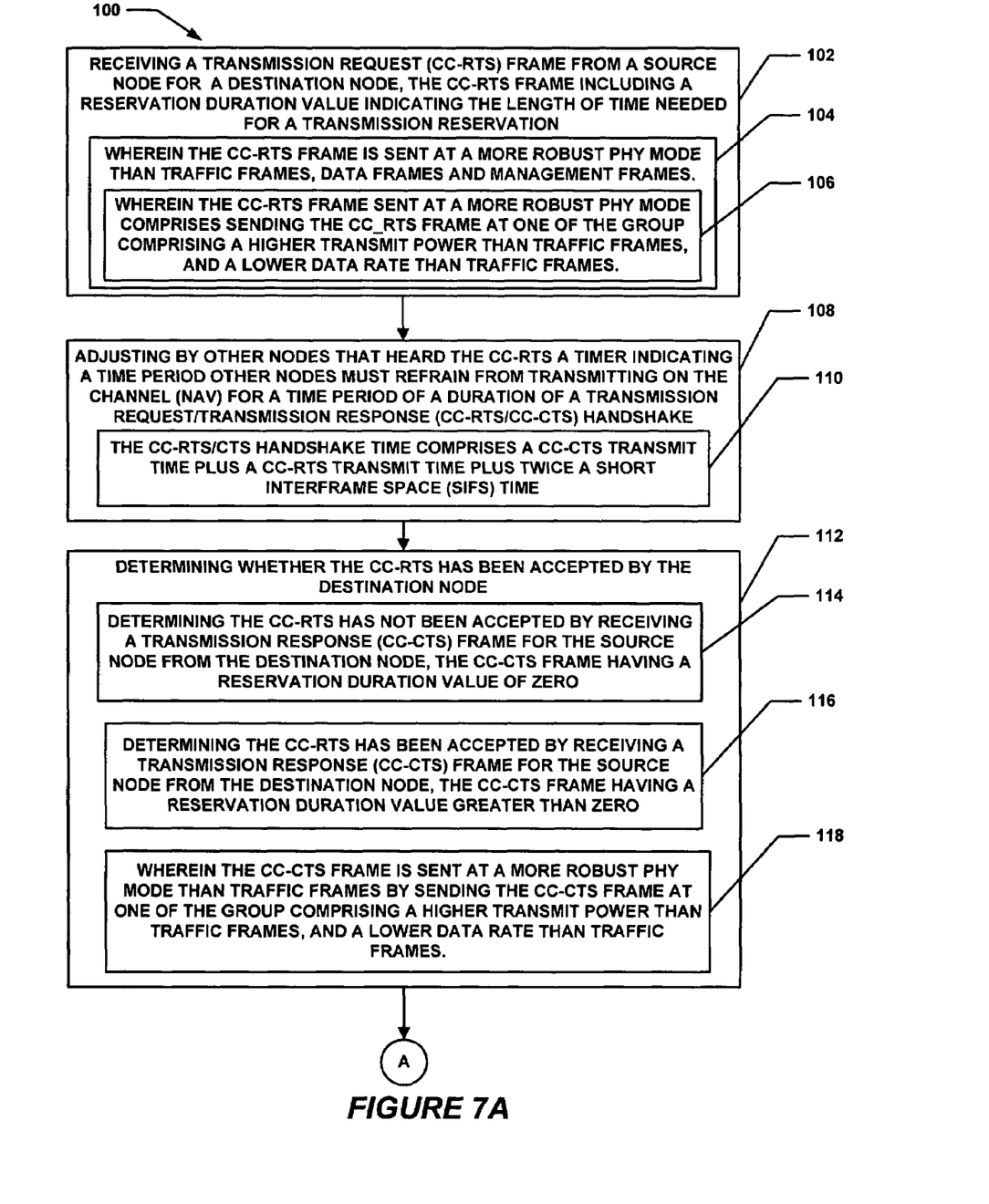
FIG. 7 comprises a flow diagram of a method of preventing hidden terminals in a wireless network in accordance with embodiments of the invention.
Figure 7B:
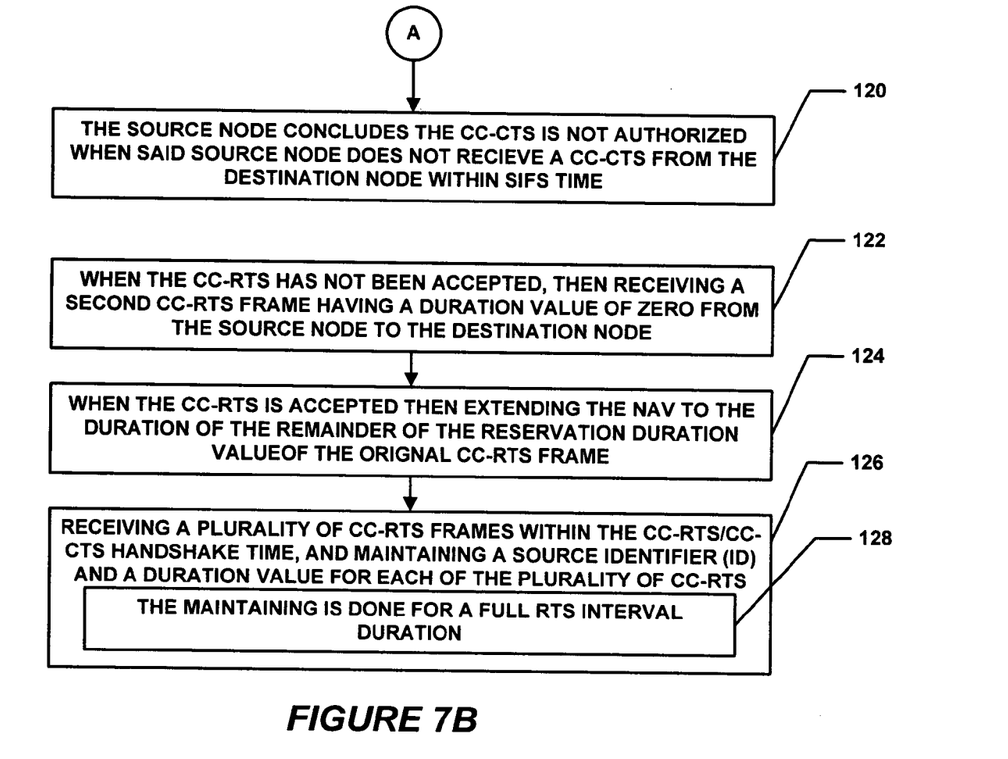

A flow chart of the presently disclosed method is depicted in FIGS. 7A and 7B. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 7A and 7B, a particular method of preventing hidden nodes in a wireless network is shown. The method 100 begins with processing block 102 which discloses receiving a transmission request (CC-RTS) frame from a source node for a destination node, the CC-RTS frame including a reservation duration value indicating the length of time needed for a transmission reservation, the CC-RTS frame sent at a more robust PHY mode than traffic frames. Processing block 104 states wherein the CC-RTS frame is sent at a more robust PHY mode than traffic frames, data frames and management frames. This is accomplished by sending the CC_RTS frame at one of the group comprising a higher transmit power than traffic frames, and a lower data rate than traffic frames as recited in processing bock 106.

Processing block 108 recites adjusting by other nodes that heard the CC-RTS a timer indicating a time period other nodes must refrain from transmitting on the channel (NAV) for a time period of a reservation duration of a transmission request/transmission response (CC-RTS/CC-CTS) handshake. As shown in processing block 110 this time duration is equal to the CC-CTS transmit time plus the CC-RTS transmit time plus the time for the two SIFS associated with the CC-CTS and the CC-RTS (CC-CTSTxTime+CC-RTSTxTime+2*SIFS).

Processing block 112 discloses determining whether the CC-RTS has been accepted by the destination node. Processing block 114 states wherein the determining whether the CC-RTS has not been accepted comprises determining whether the CC-RTS has not been accepted by receiving a transmission response (CC-CTS) frame for the source node from the destination node, the CC-CTS frame having a reservation duration value of zero, the CC-CTS frame sent at a more robust PHY mode than traffic frames. Processing block 116 recites wherein the determining whether the CC-RTS has been denied comprises determining the CC-RTS has been accepted by receiving a transmission response (CC-CTS) frame for the source node from the destination node, the CC-CTS frame having a reservation duration value greater than zero, the CC-CTS frame sent at a more robust PHY mode than traffic frames. Processing block 118 discloses wherein the CC-CTS frame is sent at a more robust PHY mode than traffic frames. This is accomplished by sending the CC_CTS frame at one of the group comprising a higher transmit power than traffic frames, and a lower data rate than traffic frames.

Processing block 120 recites the source node concludes the CC-CTS is not accepted when the source node does not receive a CC-CTS from the destination node within SIFS time.

Processing continues with processing block 122 which states when the CC-RTS has been denied, then receiving a second CC-RTS frame having a reservation duration value of zero from the source node to the destination node. Processing block 124 recites when the CC-RTS is accepted then extending the NAV to the reservation duration of the remainder of the reservation duration value of the original CC-RTS frame.

Processing block 126 discloses receiving a plurality of CC-RTS frames within the CC-RTS/CC-CTS handshake time, and maintaining a source Identifier (ID) and a reservation duration value for each of the plurality of CC-RTS frames. Processing block 128 states that the maintaining is done for a full CC-RTS interval reservation duration.

Figure 8:
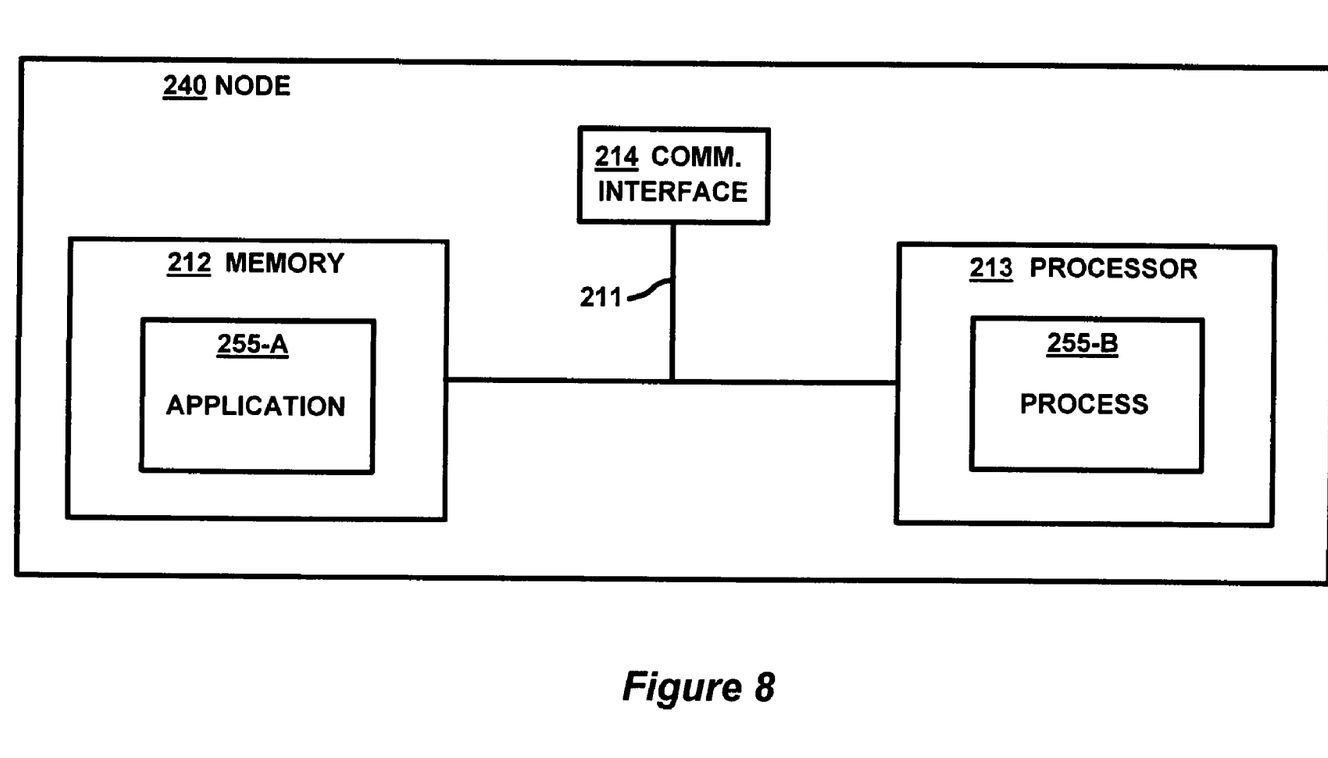
FIG. 8 comprises a block diagram of a node which operates in accordance with the present invention.

FIG. 8 illustrates example architectures of a computer system that is configured as a node 240. The node 240 may be any type of computerized system such as a personal computer, workstation, portable computing device, mainframe, server or the like. In this example, the node includes an interconnection mechanism 211 that couples a memory system 212, a processor 213, and a communications interface 214. The communications interface 214 allows the node 240 to communicate with external devices, other nodes or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention as explained above. The processor 213 can access the memory system 212 via the interconnection mechanism 211 in order to launch, run, execute, interpret or otherwise perform the logic instructions of the applications 255-A for the node in order to produce a corresponding node process 255-B. In other words, the node process 255-B represents one or more portions of the node application 255-A performing within or upon the processor 213 in the node system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method comprising:
receiving at a destination node in a Wireless Local Area Network (WLAN) a transmission request (CC-RTS) frame from a source node in said WLAN, said CC-RTS frame including a reservation duration value indicating the length of time needed for a transmission reservation;
adjusting by each node that has heard the CC-RTS a timer indicating the period said node in said WLAN must refrain from transmitting on the channel (NAV) for a time period of a reservation duration of a transmission request/transmission response (CC-RTS/CC-CTS) handshake;
determining by said destination node whether said CC-RTS has been accepted by said destination node;
when said CC-RTS has not been accepted, then receiving a second CC-RTS frame having a reservation duration value of zero at said destination node from said source node; and
when said CC-RTS is accepted by said destination node then extending said NAV to the reservation duration of the remainder of the reservation duration value of the original CC-RTS frame by said source node.

2. The method of claim 1 wherein said determining whether the CC-RTS has been denied comprises determining whether the CC-RTS has been denied by receiving a transmission response (CC-CTS) frame for said source node from said destination node, said CC-CTS frame having a reservation duration value of zero.

3. The method of claim 1 wherein said CC-RTS frame is sent at a more robust PHY than traffic frames, data frames and management frames, wherein said CC-RTS frame sent at a more robust PHY mode than traffic frames comprises sending the CC_RTS frame at one of the group comprising a higher transmit power than traffic frames, and a lower data rate than traffic frames.

4. The method of claim 2 wherein said CC-CTS frame is sent at a more robust PHY than traffic frames, data frames and management frames, wherein said CC-CTS frame sent at a more robust PHY mode than traffic frames comprises sending the CC_CTS frame at one of the group comprising a higher transmit power than traffic frames, and a lower data rate than traffic frames.

5. The method of claim 1 wherein said source node concludes that the CC-RTS is not authorized if said source node does not receive a CC-CTS from said destination node within SIFS time.

6. The method of claim 1 wherein said determining whether the CC-RTS has been accepted comprises determining the CC-RTS has been accepted by receiving a transmission response (CC-CTS) frame for said source node from said destination node.

7. The method of claim 1 wherein said CC-RTS/CC-CTS Handshake Time comprises a CC-CTS transmit time plus a CC-RTS transmit time plus twice a Short InterFrame Space (SIFS) time.

8. The method of claim 1 further comprising receiving a plurality of CC-RTS frames within said CC-RTS/CC-CTS Handshake Time, and maintaining a source Identifier (ID) and a reservation duration value for each of said plurality of CC-RTS frames.

9. The method of claim 8 wherein said maintaining is done for a full CC-RTS interval reservation duration.

10. A computer readable storage medium having computer readable code thereon for providing communications in a wireless network, the medium comprising:
instructions for receiving at a destination node in a Wireless Local Area Network (WLAN) a transmission request (CC-RTS) frame from a source node in said WLAN, said CC-RTS frame including a reservation duration value indicating the length of time needed for a transmission reservation;
instructions for adjusting by each node that has heard the CC-RTS a timer indicating the period said node in said WLAN must refrain from transmitting on the channel (NAV) for a time period of a reservation duration of a transmission request/transmission response (CC-RTS/CC-CTS) handshake;
instructions for determining by said destination node whether said CC-RTS has been accepted by said destination node;
instructions for when said CC-RTS has not been accepted, then receiving a second CC-RTS frame having a reservation duration value of zero at said destination node from said source node; and
instructions for when said CC-RTS is accepted by said destination node then extending said NAV to the reservation duration of the remainder of the reservation duration value of the original CC-RTS frame by said source node.

11. The computer readable storage medium of claim 10 wherein said instructions for determining whether the CC-RTS has been denied comprises instructions for determining whether the CC-RTS has been denied by receiving a transmission response (CC-CTS) frame for said source node from said destination node, said CC-CTS frame having a reservation duration value of zero.

12. The computer readable storage medium of claim 10 wherein said CC-RTS frame is sent at a more robust PHY than traffic frames, data frames and management frames, wherein said CC-RTS frame sent at a more robust PHY mode than traffic frames comprises sending the CC_RTS frame at one of the group comprising a higher transmit power than traffic frames, and a lower data rate than traffic frames.

13. The computer readable storage medium of claim 11 wherein said CC-CTS frame is sent at a more robust PHY than traffic frames, data frames and management frames, wherein said CC-CTS frame sent at a more robust PHY mode than traffic frames comprises sending the CC_CTS frame at one of the group comprising a higher transmit power than traffic frames, and a lower data rate than traffic frames.

14. The computer readable storage medium of claim 10 wherein said source node concludes that the CC-RTS is not authorized if said source node does not receive a CC-CTS from said destination node within SIFS time.

15. The computer readable storage medium of claim 10 wherein said instructions for determining whether the CC-RTS has been accepted comprises instructions for determining the CC-RTS has been accepted by receiving a transmission response (CC-CTS) frame for said source node from said destination node.

16. The computer readable storage medium of claim 10 wherein said CC-RTS/CC-CTS Handshake Time comprises a CC-CTS transmit time plus a CC-RTS transmit time plus twice a Short InterFrame Space (SIFS) time.

17. The computer readable storage medium of claim 10 further comprising instructions for receiving a plurality of CC-RTS frames within said CC-RTS/CC-CTS Handshake Time, and instructions for maintaining a source Identifier (ID) and a reservation duration value for each of said plurality of CC-RTS frames.

18. The computer readable storage medium of claim 17 wherein said maintaining is done for a full CC-RTS interval reservation duration.

19. A wireless network comprising:
   a source node;
   a destination node in communication with said source node;
   a plurality of other nodes in communication with said source node and said destination node; and
   wherein said source node sends a transmission request (CC-RTS) frame for said destination node, said CC-RTS frame including a reservation duration value indicating the length of time needed for a transmission reservation, the CC-RTS frame sent at a more robust PHY mode than traffic frames, said nodes that heard the CC-RTS setting a timer indicating the period other nodes must refrain from transmitting on the channel (NAV) for a time period of a reservation duration of a transmission request/transmission response (CC-RTS/CC-CTS) handshake, said source node determining whether said CC-RTS has been accepted by said destination node, when said CC-RTS has not been accepted then said source node sending a second CC-RTS frame having a reservation duration value of zero node to said destination node, and when said CC-RTS is accepted then extending said NAV to the reservation duration of the remainder of the reservation duration value of the original CC-RTS frame.

20. The wireless network of claim 19 wherein said determining whether the CC-RTS has been accepted comprises determining the CC-RTS has been accepted by receiving a transmission response (CC-CTS) frame for said source node from said destination node, said CC-CTS frame having a reservation duration value of zero, the CC-CTS frame sent at a more robust PHY mode than traffic frames, and wherein said determining whether the CC-RTS has been accepted comprises determining the CC-RTS has been accepted by receiving a CC-CTS frame for said source node from said destination node, said CC-CTS having a reservation duration value greater than zero.

21. The wireless network of claim 19 wherein a plurality of CC-RTS frames are received within said CC-RTS/CC-CTS handshake time, wherein a source Identifier (ID) and a reservation duration value are maintained for each of said plurality of CC-RTS frames, and wherein said source ID and said reservation duration value for each of said plurality of CC-RTS frames is done for a full CC-RTS interval reservation duration.

* * * * *